United States Patent [19]

Osaka et al.

[11] 3,937,843

[45] Feb. 10, 1976

[54] BEAN-ODOR-FREE SOY BEAN PRODUCT AND ITS PRODUCTION

[75] Inventors: Motomi Osaka, Osaka; Yukio Hashimoto, Izumiotsu, both of Japan

[73] Assignee: Laboratorios Del Dr. Esteve SA, Barcelona, Spain

[22] Filed: Dec. 4, 1973

[21] Appl. No.: 421,697

[30] Foreign Application Priority Data
Dec. 4, 1972  Japan................................ 47-12192
Apr. 20, 1973  Japan................................ 48-45546

[52] U.S. Cl..................................... 426/46; 426/52
[51] Int. Cl.² ........................................... A23L 1/20
[58] Field of Search ..................... 426/44, 46, 49, 52

[56] References Cited
UNITED STATES PATENTS
3,364,034   1/1968   Hoersch et al.................... 426/44 X FOREIGN PATENTS OR APPLICATIONS
7,021,609   7/1970   Japan.................................... 426/44
269,861   8/1970   U.S.S.R................................ 426/46

*Primary Examiner*—A. Louis Monacell
*Assistant Examiner*—Esther L. Massung
*Attorney, Agent, or Firm*—Henry L. Brinks

[57] ABSTRACT

A process for preparing a bean odor-free soy bean product which comprises subjecting a soy milk to lactic fermentation in the presence of a lactic acid bacterium as a starter and subjecting the resultant fermented soy milk to distillation under reduced pressure, the soy bean product being suitable for the manufacture of a nutritional drink or beverage product free from a bean odor due to its high protein concentration and excellent palatability.

25 Claims, No Drawings

BEAN-ODOR-FREE SOY BEAN PRODUCT AND ITS PRODUCTION

The present invention relates to a bean odor-free soy bean product and its production.

In recent days, there is a growing interest in vegetable proteins, particularly in soy bean proteins, from the view-points of protein resources and nutrition, and various studies have been made on their utilization. With the growing studies on the utilization of soy beans for meat substitute foodstuffs, milk substitute drinks and substitutes for dairy products, the elimination of the negative factors for the use of soy beans, particularly of the unpleasant bean odors (i.e. beany and bitter flavors), has become an important problem to be solved.

The known components of bean odors are carbonyl compounds (e.g. n-hexanal), volatile aliphatic alcohols (e.g. isopentanol, n-hexanol), phenolic acids (e.g. p-hydroxybenzoic acid), volatile fatty acids and amines having not more than 10 carbon atoms, etc. [Agr.Biol.-Chem., 29, 855; ibid., 30, 364; ibid., 30, 863; ibid., 31, 88, etc.]. However, the relationship between these bean odor components and the kind and strength of the bean odors has been not fully clarified.

For elimination or modification of bean odors, various attempts have been made. For instance, it is known that moist heating of a dough comprising defatted soy bean flour and water by the direct application of steam thereto gives a bland flavor product [U.S. Pat. No. 3,142,571]. Although such moist heating (toasting) decreases the beany and bitter flavors inherent to soy beans, a flavor incompatible with various foods is newly produced with the deterioration of functional properties such as protein solubility. It is also known that the fermentation of soy milks (soy bean juices) with enzymes, bacteria and yeasts is effective in elimination of the beany and bitter flavors and the treatment of the fermented soy milks with proteases results in the increase of the protein solubility [U.S. Pat. No. 3,585,047; British patent 1,093,013]. The application of such methods is effective in eliminating the bean odors but only incompletely and produces unfavorably a new fermentation odor. It is particularly disadvantageous that the protease treatment imparts a remarkable bitter taste to the resulting product. In addition to the methods as mentioned above, there are known some others: e.g. the addition of fruit juices [J.Food Science, 36, 729]; the use of ion exchange resins [U.S. patent 3,154,531]; the application of distillation under reduced pressure [Shokuhin Kogyo ("Food Industry"), 10 (16), 48–52 (1967) (Japan)] etc. However, none of them is satisfactorily effective in elimination of the bean odors.

As is well known, soy milks are per se useful as nutritional drinks or beverages. They are also useful as the starting material for manufacture of various soy bean processed products. Thus, the elimination of the unpleasant bean odor from soy milks may make them much more valuable as foodstuffs.

A main object of the present invention is to embody a method for elimination of the bean odors from soy bean products, particularly from soy milks. Another object of this invention is to embody a method for elimination of the beany and bitter flavors characteristic to soy beans from soy bean products, particularly from soy milks, without producing any new unpleasant odor. Another object of the invention is to embody a process for preparing a bean odor-free soy milk without deterioration of the protein solubility. A further object of the invention is to embody a process for preparing a bean odor-free soy bean product excellent in savor and texture. A still further object of the invention is to embody a process for preparing a bean odor-free soy bean drink or beverage excellent in palatability and proteinous colloidal stability. These and other objects will be apparent to those skilled in the art from the foregoing and subsequent descriptions.

According to the present invention, a soy milk is subjected to lactic fermentation and the fermented soy milk is allowed to distill under reduced pressure, whereby the bean odor present in the soy milk is satisfactorily eliminated.

These treatments are essential in the process of this invention, because the execution of only either one of them does not afford any satisfactory result in the elimination of the bean odor. Although the mechanism of the elimination of the bean odor by the above process is still uncertain, it may be assumed that the bean odor is partly eliminated as the result of the lactic fermentation and partly modified to other flavor components, which are readily and effectively eliminated together with the fermentation odor produced in the lactic fermentation by the distillation under reduced pressure. Since high temperatures are not used in the said process, the functional properties of the proteins in the soy milk are not materially deteriorated and the protein solubility can be maintained as in the original.

The term "soy milk" herein used is intended to mean any aqueous dispersion containing soy bean proteins. The preferred one is obtained by extraction of defatted soy beans with water or aqueous alkali solution, if necessary, followed by removal of water-insoluble materials therefrom. It may also be the one obtained by dispersing soy bean proteins isolated from soy beans in water.

The lactic fermentation is carried out by fermenting the soy milk in the presence of a lactic acid bacterium as a starter. In order to have the fermentation proceed smoothly and also to prevent the putrefaction of the fermentation mixture, the soy milk is favorably previously sterilized by heating, incorporated with any saccharide utilizable by the lactic acid bacterium and adjusted to pH 6.0 to 7.5. With respect to the sterilization by heating, care should be taken to avoid the deterioration of the functional properties of the soy bean proteins. Thus, for example, the sterilization at a temperature of 60° to 80°C for a period of 10 to 30 minutes is recommendable. Examples of the saccharide are lactose, glucose, etc. The amount of the saccharide to be incorporated may be usually from 0.01 to 5 % by weight, preferably from 0.1 to 2 % by weight on the basis of the amount of the fermentation mixture.

The lactic acid bacterium may be any conventional one used for lactic fermentation belonging to the Lactobacillus genus, Streptococcus genus, Leuconostock genus, Pediococcus genus, etc. Specific examples of the lactic acid bacterium are *Lactobacillus acidophilus, Lactobacillus bulgaricus, Streptococcus lactis, Streptococcus cremoris, Streptococcus durans, Streptococcus thermophilus, Leuconostock citrovorum*, etc. Among them, particularly preferred are *Lactobacillus acidophilus, Lactobacillus helveticus* and *Streptococcus thermophilus*. These bacteria may be used alone or in combination. The amount of the lactic acid bacterium to be added may be usually from 2 to 4 % by weight based on the fermentation mixture.

The fermentation temperature and the fermentation period may be appropriately decided depending on the kind of the lactic acid bacterium to be used. Usually, the preferred fermentation temperature is from 30° to 45°C and the optimum fermentation period is from 15 to 20 hours. Even a shorter period of time such as one hour is, however, still sometimes effective.

The progress of the fermentation may be traced by checking the acidity of the fermentation mixture. When, for instance, the initial pH of the fermentation mixture is about 6.4, the fermentation may be continued until the acidity reaches about 0.5 to 0.9. An excessive fermentation reaching, for instance, an acidity of more than 4 is usually unfavorable, because the resulting product may be given a salty taste upon neutralization which may be necessitated at any later stage.

As the result of the lactic fermentation, the pH is lowered. In case of the pH being below about 6, the soy milk is normally coagulated. Such coagulated soy milk is usually subjected to distillation under reduced pressure after homogenization by a conventional manner, for instance, using a homomixer, a homogenizer or the like. If the soy milk is not coagulated as the result of the lactic fermentation, it may be subjected to the distillation as such, i.e. without previous homogenization. When desired, the adjustment to a suitable pH may be made at this stage, i.e. after the lactic fermentation and before the distillation.

The distillation is effected under reduced pressure, i.e. under any pressure lower than atmospheric pressure. In general, it may be carried out at a temperature of 10° to 85°C (preferably 40° to 70°C) under a pressure of not more than 500 mmHg (preferably 55 to 250 mmHg). When the temperature is higher than about 90°C, functional properties of the soy bean proteins may be deteriorated. The distillation at a temperature lower than about 5°C and/or under a pressure higher than about 700 mmHg may not be effective in the elimination of the volatile components which cause the beany and bitter flavors. Also, the distillation may be effected while introducing steam into the fermented soy milk. In other words, the distillation includes not only an ordinary distillation but also a steam distillation. Reducing the atmosphere in the reaction vessel wherein the distillation is effected may be accomplished by the use of a conventional apparatus such as a rotary evaporator. An apparatus for high temperature short time sterilization may sometimes be employed as such for establishment of the desired atmosphere as above. The extent of the distillation under reduced pressure can be readily determined by experiment or by experience according to the kind of an apparatus used therein. In this respect, it is one recommendation to carry out the distillation in such a manner that a certain amount of water is added to the fermentation mixture (usually one-half to one-third of the volume of the latter) and then the amount of water nearly equal to the added amount is distilled out or that a certain amount of water is simply distilled out from the fermentation mixture (usually one-third to one-fourth of the volume of the starting soy milk).

For interruption of the fermentation, heating to 60° to 85°C may be adopted. However, heating of the fermented soy milk at a pH around the isoelectric point (e.g pH 4 to 5) tends to promote the deterioration of the functional properties of the soy bean proteins and should be avoided. Thus, the adjustment to an appropriate pH prior to the distillation is favorable. But, such pH adjustment may be omitted when the distillation is effected at a temperature of 60° to 70°C.

The thus produced soy milk product is free from the beany aand bitter flavors characteristic of soy beans and does not have any new roasting or fermenting odor. It shows a high nitrogen soluble index (NSI), and no material NSI decrease in comparison with that of the original soy milk is seen. Also, it shows only a scarce deterioration in gel formation property or any other functional properties.

The above soy milk product may be used as the starting material for the manufacture of bean odor-free soy bean products such as soy been cheese and textured vegetable protein according to per se conventional procedures.

When desired, the neutralization for making a pH of around 7 may be effected at any step after the lactic fermentation, for instance, prior to or after the homogenization or after the distillation under reduced pressure.

Further, treatment with a protease may be carried out simultaneously with or prior to the lactic fermentation. In such case, the adjustment of the pH in the distillation under reduced pressure below the isoelectric point is advantageous in affording a lactic fermentation drink or beverage product which has an excellent savor and is well palatable with the preservation of a high protein content.

In the manufacture of such a lactic fermentation drink or beverage product, it is notable that the bitter taste produced as the result of the protease treatment can be eliminated by the lactic fermentation simultaneously or subsequently effected and the distillation under reduced pressure performed thereafter. It is also notable that the fermented soy milk after the protease treatment and the lactic fermentation shows considerable decreases in the acidity and the viscosity after the distillation under reduced pressure at a pH below the isoelectric point, compared with those before such distillation.

While no conventional lactic fermentation drink or beverage can maintain such a high protein concentration as 10 to 12 % by weight, the lactic fermentation drink or beverage product of this invention can effect this result. Thus, this invention makes it possible to manufacture such a product efficiently with an apparatus of small capacity. Further, the product is of high nutritional value in having a much higher protein concentration than that of a conventional product. It is highly advantageous that, in spite of having such a high protein concentration, the product does not give a bad feel to the mouth such as a sticky or powdery taste but imparts a bland taste due to the reduced acidity and viscosity as mentioned above.

The protease to be used in the said treatment may be appropriately selected taking the pH of the soy milk and the optimum pH of the protease into consideration. When, for instance, the protease treatment is carried out simultaneously with the lactic fermentation, the pH of the soy milk moves to the acidic side. Therefore, the use of a protease having an optimum pH on the acidic side (e.g. "Morsin" manufactured by Morishin Pharmaceutical Co., Ltd.; "Sanprose" manufactured by Ueda Chemical Co., Ltd.; "Rapidase" manufactured by Takeda Chemical Industries, Ltd.) is favored. When the protease treatment is effected prior to the lactic fermentation, the soy milk to be treated has a pH of around 7.0, and therefore the use of a neutral protease (e.g. "Protin" manufactured by Daiwa Chemical Co., Ltd.; "Protease Amano" manufactured by Amano Pharmaceutical Co., Ltd.) is preferred. The amount of the protease to be used may be usually from 0.0001 to 0.1 % by weight, preferably from 0.0005 to 0.002 % on the basis of the amount of the soy milk.

The fermented soy milk after the protease treatment and the lactic fermentation is adjusted to a pH not higher than an isoelectric point, usually not more than 4 and preferably from 3.0 to 3.8, after or during homogenization. By such pH adjustment, the fermented soy milk in a coagulated state is made easily applicable to the distillation under reduced pressure in the subsequent step and also is imparted a certain acidity. For the pH adjustment, there may be used such an acid as hydrochloric acid, phosphoric acid, citric acid, tartaric acid, succinic acid, malic acid or the like.

After the distillation under reduced pressure is accomplished, the resulting product is subjected to sterilization while heating at a temperature of 70° to 85°C. If desired, such product may be incorporated with a flavoring agent, a gummy substance, etc., followed by homogenization. The thus obtained product is rather a condensed product suitable for storage and transportation and may be diluted appropriately upon drinking.

Practical and presently preferred embodiments of the present invention are illustratively shown in the following Examples wherein % is by weight.

EXAMPLE 1

Defatted soy bean obtained by extraction of soy beans with n-hexane at a low temperature was dispersed in water, and a small amount of sodium hydroxide was added thereto. Removal of insoluble materials from the resultant mixture gave a soy milk having a solids content of 6 %. To the soy milk (2 kg), lactose (30 g) was added, and the resultant mixture was sterilized by heating at 80°C for 20 minutes, and the pH was adjusted to 6.3. After the addition of *Lactobacillus acidophilus* as a starter in an amount of 4 % to the said mixture, fermentation was carried out at 37°C to make an acidity of 0.6. The coagulated soy milk was homogenized by the aid of a homomixer, neutralized with sodium hydroxide to make pH 6.8 and heated at 70°C for 30 minutes so as to interrupt the fermentation. To the fermentation mixture, there was added a half volume of water, and distillation under reduced pressure was carried out by the use of a rotary evaporator to remove a nearly equal volume of water with respect to the added volume whereby a soy milk product free from a bean odor was obtained.

EXAMPLE 2

To a soy milk (2 kg) obtained as in Example 1, glucose (20 g) was added, and the resulting mixture was heated at 80°C for 20 minutes and the pH was adjusted to 6.6. After the addition of *Lactobacillus acidophilus* and *Streptococcus thermophilus* as starters in an amount of 3 % to the said mixture, fermentation was carried out at 37°C for 20 hours to make an acidity of 0.7. The resultant mixture was homogenized by the aid of a homomixer and neutralized with sodium hydroxide to make pH 7.2. To the fermentation mixture, there was added a half volume of water, and distillation under reduced pressure was carried out at 65°C by the use of a rotary evaporator to remove a nearly equal volume of water with respect to the added volume whereby a soy milk product free from a bean odor was obtained.

EXAMPLE 3

A soy milk in a coagulated state obtained is in Example 1 was homogenized and subjected to distillation under reduced pressure at 50°C while blowing steam therein. The resultant mixture was neutralized with sodium hydroxide to make pH 6.7 and heated at 75°C for 20 minutes to give a soy milk product free from a bean odor.

EXAMPLE 4

Defatted soy bean as in Example 1 was dispersed in water, and insoluble materials were removed. Hydrochloric acid was added to the water solution to make a curd. The curd was admixed with water and adjusted to make pH 6.8 whereby a soy milk having a protein concentration of 9.0 % and an NSI of 92 was obtained. To the soy milk (2.0 kg), lactose (40 g) and sucrose (190 g) were added, and a protease (Rapidase manufactured by Takeda Chemical Industries, Ltd.) (0.016 g) and *Streptococcus thermophilus* of an acidity of 0.75 (30 g) were further added thereto. Fermentation was carried out at 35°C for 16 hours and the mixture coagulated. A flavoring agent (e.g. honey) (230 g) was added thereto, and the resultant mixture was homogenized while adjusting the pH with tartaric acid at 5° to 8°C to 3.6. After the addition of water (1.0 l), the resultant mixture was subjected to distillation under reduced pressure by the aid of a rotary evaporator to remove the nearly equal volume of water with respect to the added volume. The resulting mixture was heated at 80°C for about 20 minutes to sterilize it and cooled to 5° to 8°C whereby a condensed product having a pH of 3.6 and an acidity of 1.20 was obtained. The condensed product was diluted with water to make a 2.5 fold dilution, which was used for drinking.

The comparison of the properties of the above diluted product for drinking and those of a 2.5 fold dilution of the fermented soy milk before the distillation under reduced pressure which was adjusted to pH 3.6 is shown in the following Table 1:

Table 1

| | 2.5 Fold dilution of the condensed product obtained by distillation | 2.5 Fold dilution of the product obtained without distillation |
|---|---|---|
| Viscosity (cps) | 2.5 | 25 |
| Acidity | 0.47 | 0.54 |
| Flavor | Neither bean odor nor fermentation odor | Bean odor and fermentation odor |
| Palate | Smooth | Viscous and powdery |

The protein concentration of the said diluted product was 29 %, and its NSI and pH were respectively 929 and 36

In the product adjusted to pH 36 without protease treatment in the above operation, there was produced a large amount of precipitates.

EXAMPLE 5

Defatted soy bean as in Example 1 was dispersed in water, and insoluble materials were removed to obtain a soy milk having a protein concentration of 5.0 %. To the soy milk (2.0 kg), a protease (Protin manufactured by Daiwa Chemical Co., Ltd.) (0.03 g) was added, and treatment was effected at 40°C for 5 hours. After the addition of lactose (30 g) and sucrose (170 g), the resultant mixture was stirred, and a mixed starter consisting of *Lactobacillus acidophilus* and *Streptococcus thermophilus* was added thereto. Fermentation was carried out at 35°C for 15 hours. A flavoring agent (e.g. honey) (230 g) was added thereto, and the resultant mixture was homogenized and adjusted to pH 3.5 with hydrochloric acid at 5° to 8°C. The resulting mixture was evaporated under reduced pressure by the use of a rotary evaporator to remove about a one-third volume of water and sterilized by heating to afford a condensed product having a pH of 3.5 and an acidity of 1.15. Dilution of the condensed product in an amount of 2.5 fold gave a diluted product having an acidity of 0.45.

Dilution of the product as above but before the distillation under reduced pressure in an amount of 1.7 fold to make the same protein concentration as that of the 2.5 fold dilution showed an acidity of 0.55.

EXAMPLE 6

To 1 kg of a soy milk obtained as in Example 1, lactose (5 g) and *Streptococcus lactis* (20 g) as a starter were added, and fermentation was carried out at 35°C for 2 hours. After the addition of water (200 g), the resultant mixture was subjected to distillation under reduced pressure by the aid of a rotary evaporator to remove the nearly equal amount of water with respect to the added amount and then adjusted to pH 6.8. The incorporation of a flavoring agent into the resulting mixture gave a drink free from a bean odor and of good acceptability.

EXAMPLE 7

To 1 kg of a soy milk obtained in Example 1, *Streptococcus thermophilus* (30 g) was added as a starter, and the resultant mixture was kept at 50°C to make an acidity of 0.20. While maintaining the resulting mixture at the same temperature as above, δ-gluconolactone (2 g) was added thereto for coagulation. Then, the obtained curd was subjected to curd breaking, condensation, whey separation, salt addition and mellowing according to a conventional procedure for manufacture of a cheese product. The obtained cheese product was free from a bean odor and had an excellent texture.

EXAMPLE 8

The test samples as shown in Table 2 were prepared and given to 5 panel members. The results are shown in Table 2, wherein the numerals indicate the orders of the test samples of which the odors were more improved (i.e. the smaller numerals indicating better ranks).

Note: (1) The test sample No. 5 was the bean odor-free soy milk product obtained as in Example 1. The fermentation conditions for the test samples Nos. 3 and 5 and the distillation under reduced pressure for the test samples Nos. 2 and 3 were as in Example 1. Prior to and/or after the fermentation for the test samples, heat sterilization and pH adjustment were effected. (2) The distillates obtained by the distillation of the test samples Nos. 2 and 5 under reduced pressure were subjected to examination, and it was noted that the one involving to the test sample No. 2 contained an extremely scarce amount of odor components.

What is claimed is:

1. A method for elimination of a bean odor from a soy milk which comprises subjecting the soy milk containing added saccharide to lactic fermentation until the acidity thereof is not more than 4 and then distilling the resulting fermented soy milk at a temperature of 10° to 85°C. under a pressure of not more than 500 mmHg.

2. The method according to claim 1, wherein the soy milk is obtained by extraction of defatted soy beans with water.

3. The method according to claim 2, wherein the soy milk is adjusted to pH 6.0 to 7.5.

4. The method according to claim 3, wherein the soy milk contains said saccharide in a concentration of 0.01 to 5% by weight.

5. The method according to claim 4, wherein the saccharide is lactose or glucose.

6. The method according to claim 1, wherein the lactic fermentation is effected in the presence of a lactic acid bacterium as a starter at a concentration of 2 to 4 % by weight.

7. The method according to claim 6, wherein the lactic acid bacterium is *Lactobacillus acidophilus*, *Lactobacillus helveticus* or *Streptococcus thermophilus*.

8. The method according to claim 1, wherein the lactic fermentation is effected until the soy milk is coagulated.

9. The method according to claim 8, wherein the coagulated soy milk is then homogenized.

10. The method according to claim 1, wherein the distillation under reduced pressure is effected at a temperature of 40° to 70°C under a pressure of 55 to 250 mmHg.

11. The method according to claim 1, wherein the soy milk after the lactic fermentation is neutralized at any stage of the procedure.

12. A process for preparing a bean odor-free soy milk product which comprises subjecting a soy milk to lactic fermentation until the acidity thereof is about 0.5 to 0.9 and then subjecting the resulting fermented soy milk to distillation at a temperature of 10° to 85°C. under a Table 2

| No. | Test sample | | | Evaluation (on the average) | | | | | |
|-----|-------------|---|---|---|---|---|---|---|---|
| 1 | Soy milk | | | 5 | 5 | 5 | 5 | 5 | (5.0) |
| 2 | Soy milk— | Distillation under reduced pressure | | 2 | 4 | 4 | 4 | 4 | (3.6) |
| 3 | Soy milk— | Distillation under reduced pressure | —Lactic fermentation | 3 | 1 | 2 | 3 | 2 | (2.2) |
| 4 | Soy milk— | Lactic fermentation | | 4 | 3 | 3 | 2 | 3 | (3.0) |
| 5 | Soy milk— | Lactic fermentation | —Distillation under reduced pressure | 1 | 2 | 1 | 1 | 1 | (1.2) | reduced pressure of not more than 500 mmHg.

13. The process according to claim 12, wherein the soy milk is treated with a protease simultaneously with or prior to the lactic fermentation.

14. The process according to claim 13, wherein the soy milk after the lactic fermentation is adjusted to a pH of not more than the isoelectric point.

15. The process according to claim 14, wherein the pH is adjusted to not more than 4.

16. The process according to claim 15, wherein the pH is adjusted to 3.0 to 3.8.

17. A process for preparing a drink product which comprises subjecting a soy milk to protease treatment and lactic fermentation, and fermentation being carried out until the acidity of the fermented soy milk is not more than 4, homogenizing the resulting soy milk, adjusting the pH of the resultant soy milk to not more than 4 and subjecting the thus obtained soy milk to distillation at a temperature of 10° to 85°C. under a reduced pressure of not more than 500 mmHg.

18. The process according to claim 17, wherein the protease treatment is effected prior to the lactic fermentation.

19. The process according to claim 18, wherein the protease treatment is effected in the presence of a neutral protease.

20. The process according to claim 17, wherein the protease treatment is effected simultaneously with the lactic fermentation.

21. The process according to claim 20, wherein the protease treatment is effected in the presence of an acidic protease.

22. The method according to claim 6, wherein the lactic acid bacterium belongs to a genus selected from the group consisting of Lactobacillus, Streptococcus, Leuconostoc and Pediococcus.

23. The process according to claim 12, wherein the distillation under reduced pressure is effected at a temperature of 40° to 70°C. under a pressure of 55 to 250 mmHg.

24. The process according to claim 17, wherein the distillation under reduced pressure is effected at a temperature of 40° to 70°C. under a pressure of 55 to 250 mmHg.

25. The process according to claim 12, wherein a saccharide is added to the soy milk prior to the lactic fermentation.

* * * * *

UNITED STATES PATENT OFFICE
CERTIFICATE OF CORRECTION

Patent No. 3,937,843      Dated Feb. 10, 1976

Inventor(s) Motomi Osaka and Yukio Hashimoto

It is certified that error appears in the above-identified patent and that said Letters Patent are hereby corrected as shown below:

In the heading of the patent, please make the following corrections:

"[73] Assignee:" Delete "Laboratorios Del Dr. Esteve SA, Barcelona, Spain" and substitute therefor -- Fuji Oil Co., Ltd., Osaka, Japan --

"[30] Foreign Application Priority Data", correct to read as follows:

-- Dec. 4, 1972     Japan .......... 47-121924

Apr. 20, 1973     Japan .......... 48-45546 --

Under the heading "Attorney, Agent, or Firm", delete "Henry L. Brinks" and substitute therefor -- Stewart and Kolasch, Ltd. --

Signed and Sealed this twenty-second Day of June 1976

[SEAL]

Attest:

RUTH C. MASON
*Attesting Officer*

C. MARSHALL DANN
*Commissioner of Patents and Trademarks*